(12) United States Patent
Tomioka et al.

(10) Patent No.: US 8,312,731 B2
(45) Date of Patent: Nov. 20, 2012

(54) REFRIGERATION APPARATUS AND METHOD FOR CONTROLLING THE SAME

(75) Inventors: Satoshi Tomioka, Kawasaki (JP); Hideya Tamura, Kawasaki (JP); Tetsuya Ito, Kawasaki (JP); Takahiro Matsunaga, Kawasaki (JP); Takamitsu Kurokawa, Kawasaki (JP); Shintaro Sanada, Kawasaki (JP)

(73) Assignee: Fujitsu General Limited, Kawasaki-Shi (JP)

( * ) Notice: Subject to any disclaimer, the term of this patent is extended or adjusted under 35 U.S.C. 154(b) by 456 days.

(21) Appl. No.: 12/591,855

(22) Filed: Dec. 3, 2009

(65) Prior Publication Data

US 2010/0146994 A1 Jun. 17, 2010

(30) Foreign Application Priority Data

Dec. 11, 2008 (JP) ................................. 2008-315654

(51) Int. Cl.
*F25B 43/02* (2006.01)

(52) U.S. Cl. ............................................. 62/84; 62/470

(58) Field of Classification Search .............. 62/84, 470, 62/509, 510, 228.3, 228.4, 468
See application file for complete search history.

(56) References Cited

U.S. PATENT DOCUMENTS

| | | | | |
|---|---|---|---|---|
| 5,359,859 A * | 11/1994 | Bench et al. | ...................... | 62/85 |
| 5,369,958 A * | 12/1994 | Kasai et al. | ...................... | 62/158 |
| 5,799,867 A * | 9/1998 | Misawa | ......................... | 237/2 B |
| 6,453,691 B1 * | 9/2002 | Seo et al. | ...................... | 62/228.5 |
| 6,832,488 B2 * | 12/2004 | Yokozeki et al. | ............... | 62/175 |
| 6,941,767 B2 * | 9/2005 | Matsuoka et al. | .............. | 62/470 |
| 6,966,194 B2 * | 11/2005 | Yokozeki et al. | ............ | 62/196.3 |
| 7,584,624 B2 * | 9/2009 | Hwang et al. | ................... | 62/192 |
| 8,091,377 B2 * | 1/2012 | Jeong et al. | .................... | 62/324.6 |
| 2002/0073721 A1 * | 6/2002 | Seo et al. | ...................... | 62/228.3 |
| 2003/0056534 A1 * | 3/2003 | Tsuboe et al. | ................... | 62/510 |
| 2004/0231357 A1 * | 11/2004 | Matsuoka et al. | ............... | 62/470 |
| 2005/0081537 A1 * | 4/2005 | Hwang et al. | .................... | 62/84 |
| 2005/0086960 A1 * | 4/2005 | Yokozeki et al. | ............ | 62/228.3 |
| 2006/0032255 A1 * | 2/2006 | Hwang et al. | ................. | 62/228.1 |
| 2008/0087028 A1 * | 4/2008 | Kim et al. | ......................... | 62/84 |

* cited by examiner

*Primary Examiner* — Mohammad Ali

(74) *Attorney, Agent, or Firm* — Manabu Kanesaka

(57) ABSTRACT

A refrigeration apparatus includes an outdoor unit having a first compressor and a second compressor connected in parallel with each other, a first oil separator attached to the first compressor and connected to a suction pipe of the second compressor via a first oil return piping including a pressure reducing device, and a second oil separator attached to the second compressor and connected to a suction pipe of the first compressor via a second oil return piping including a pressure reducing device. The suction pipes of the first and second compressors are connected together. The first compressor is a variable-speed compressor, and the second compressor is a constant-speed compressor. A solenoid valve selectively forming a bypass circuit with respect to the pressure reducing device, is connected in parallel with the pressure reducing device of the first oil return piping. The solenoid valve is opened when the first compressor is restarted.

5 Claims, 2 Drawing Sheets ically prevented. Further, since the pressure reducing means is provided in the oil return piping, the refrigerator oil is prevented from flowing excessively on the suction side of the other compressor.

REFRIGERATION APPARATUS AND METHOD FOR CONTROLLING THE SAME

CROSS-REFERENCE TO RELATED APPLICATIONS

The present application is based on, and claims priority from, Japanese Application Serial Number JP2008-315654, filed Dec. 11, 2008, the disclosure of which is hereby incorporated by reference herein in its entirety.

TECHNICAL FIELD

The present invention relates to a refrigeration apparatus that is provided with at least two compressors, a first compressor and a second compressor connected to an outdoor unit in parallel, and is suitable for large buildings such as office buildings and apartment houses. More particularly, it relates to a refrigeration apparatus provided with oil return piping through which a refrigerator oil is returned from the first compressor to the second compressor or from the second compressor to the first compressor, and a method for controlling the refrigeration apparatus.

BACKGROUND ART

For air-conditioning equipment for a large building such as an office building and an apartment house, a so-called multiple air conditioning system has been used in which a refrigerant is supplied from one outdoor unit to a plurality of indoor units installed in the building. In the large-scale system of this type, the outdoor unit is sometimes provided in plural numbers.

In the multiple air conditioning system, the required air cooling capacity or heating capacity differs depending on the number of operating indoor units. Therefore, to meet this condition, a plurality of compressors are mounted in the outdoor unit.

The case where two compressors are mounted is explained. Usually, as a first compressor, a variable-speed compressor in which the rotational speed is variable due to inverter control is used, and as a second compressor, a constant-speed compressor in which the rotational speed is constant is used.

Up to a predetermined capacity, the second compressor is not operated, and only the first compressor is operated with the rotational speed thereof being controlled by an inverter. In contrast, when a capacity higher than a predetermined value is required, the second compressor of constant-speed type is operated together with the first compressor.

Thus, in both of the case where only the first compressor is operated and the case where both of the first and second compressors are operated, the excess and deficiency of a refrigerator oil in the compressors must be prevented.

As one example of the preventive measures, in the invention described in Patent Document 1 (Japanese Patent Application Publication No. 2001-324230), the refrigerator oil storage part of the first compressor and the suction pipe of the second compressor are connected to each other via oil return piping having a pressure reducing means, and the refrigerator oil storage part of the second compressor and the suction pipe of the first compressor are connected to each other via oil return piping having a pressure reducing means.

According to the invention described in Patent Document 1, when both of the two compressors are operated, excess refrigerator oil is returned from the first compressor to the second compressor or from the second compressor to the first compressor, and when only one compressor is operated, excess refrigerator oil is returned to the own machine, so that a proper amount of refrigerator oil is held in the compressors.

The oil return piping is provided with a capillary tube serving as the pressure reducing means. Therefore, when the compressor is stopped, an equal pressure is not always provided on the discharge side and suction side thereof.

This presents a problem especially when the first compressor (inverter compressor) is restarted. Specifically, in the case of the inverter compressor, if the pressure difference between the discharge side and the suction side is large at the restart time, an excessive load is applied to a motor. Therefore, a motor protecting circuit is activated, and the starting may fail.

SUMMARY OF THE INVENTION

Accordingly, an object of the present invention is to provide a refrigeration apparatus in which oil return piping having a pressure reducing means is provided to return a refrigerator oil from a first compressor to a second compressor or from the second compressor to the first compressor, these compressors being connected to each other in parallel, and the first compressor can surely restarted after operation stoppage even in the case where an inverter compressor is used as the first compressor, and a method for controlling the refrigeration apparatus.

To achieve the above object, the present invention provides a refrigeration apparatus in which an outdoor unit includes at least two compressors, a first compressor and a second compressor, which are connected in parallel with each other; an oil separator is provided in a discharge pipe of each of the compressors; a first oil separator on the first compressor side is connected to a suction pipe of the second compressor via first oil return piping including a pressure reducing means, and a second oil separator on the second compressor side is connected to a suction pipe of the first compressor via second oil return piping including a pressure reducing means; and the first compressor is a variable-speed compressor in which the rotational speed is variable due to inverter control, and the second compressor is a constant-speed compressor in which the rotational speed is constant, wherein a solenoid valve that selectively forms a bypass circuit with respect to the pressure reducing means is connected in parallel with the pressure reducing means of the first oil return piping.

As a preferable mode, an electronic expansion valve may be used in place of the parallel circuit of the pressure reducing means and the solenoid valve in the first oil return piping.

Also, the present invention provides a method for controlling a refrigeration apparatus in which an outdoor unit includes at least two compressors, a first compressor and a second compressor, which are connected in parallel with each other; an oil separator is provided in a discharge pipe of each of the compressors; a first oil separator on the first compressor side is connected to a suction pipe of the second compressor via first oil return piping including a pressure reducing means, and a second oil separator on the second compressor side is connected to a suction pipe of the first compressor via second oil return piping including a pressure reducing means; and the first compressor is a variable-speed compressor in which the rotational speed is variable due to inverter control, and the second compressor is a constant-speed compressor in which the rotational speed is constant, wherein a solenoid valve that selectively forms a bypass circuit with respect to the pressure reducing means is connected in parallel with the pressure reducing means of the first oil return piping; in restarting the first compressor after the operation of the first and second compressors has been stopped, the solenoid valve is turned on to form the bypass circuit and to cause the discharge side and the suction side of the first compressor to be in an approximately equalized state; and thereafter the first compressor is restarted.

In the method for controlling the refrigeration apparatus in accordance with the present invention, preferably, the configuration may be made such that an electronic expansion valve is used in place of the parallel circuit of the pressure reducing means and the solenoid valve in the first oil return piping; in restarting the first compressor after the operation of the first and second compressors has been stopped, the solenoid valve is fully opened to cause the discharge side and the suction side of the first compressor to be in an approximately equalized state; and thereafter the first compressor is restarted.

According to the present invention, in the configuration in which the first oil separator on the first compressor (inverter compressor) side is connected to the suction pipe of the second compressor (constant-speed compressor) via the first oil return piping including the pressure reducing means, and the second oil separator on the second compressor side is connected to the suction pipe of the first compressor via the second oil return piping including the pressure reducing means, the solenoid valve that selectively forms the bypass circuit with respect to the pressure reducing means is provided in parallel with the pressure reducing means of the first oil return piping, and when the solenoid valve is turned on at the time of operation stoppage of compressors, the discharge side and the suction side of the first compressor become in an equalized state, so that the first compressor can be restarted surely.

DETAILED DESCRIPTION

A refrigeration apparatus in accordance with an embodiment of the present invention will now be described with reference to FIGS. 1 and 2. The present invention is not limited to this embodiment.

Figure 1:
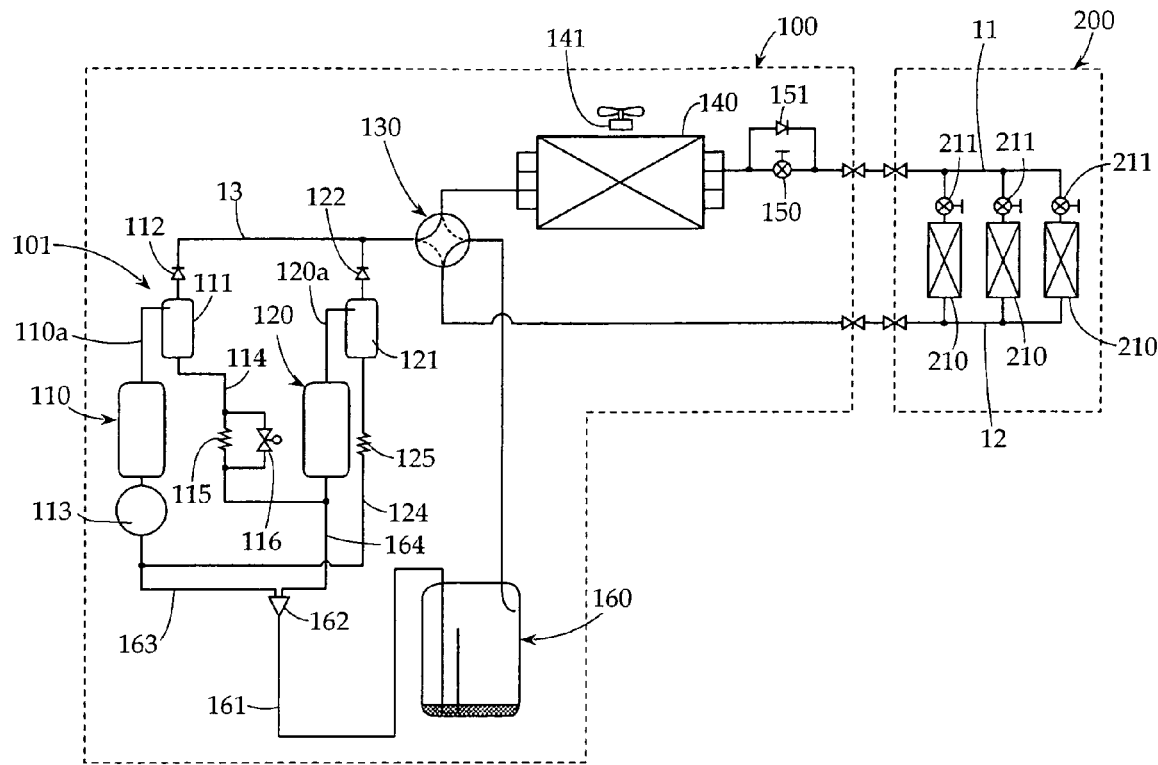
FIG. 1 is a refrigerant circuit diagram showing a general configuration of a refrigeration apparatus in accordance with an embodiment of the present invention.

Referring to FIG. 1, this refrigeration apparatus includes an outdoor unit 100 and an indoor unit 200. The outdoor unit 100 includes a compression mechanism section 101, a four-way valve (directional control valve) 130, an outdoor heat exchanger 140 having an outdoor fan 141, an outdoor expansion valve 150, and an accumulator 160.

In the indoor unit 200, a plurality of (three in this example, for convenience of drawing the figure) indoor heat exchangers 210 each having an indoor expansion valve 211 are connected in parallel between liquid-side piping 11 and gas-side piping 12. Each of the indoor heat exchangers 210 is provided with an indoor fan, but the fan is omitted in the figure.

Figure 2:
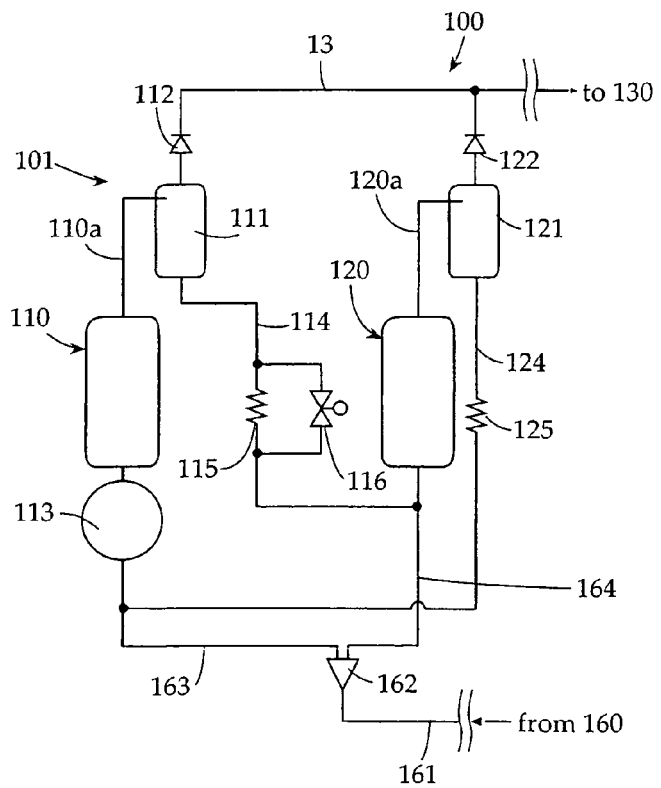
FIG. 2 is an enlarged view of a compressor section of an outdoor unit included in the refrigeration apparatus shown in FIG. 1.

Referring to FIG. 2, according to this embodiment, the compression mechanism section 101 is provided with two compressors, a first compressor 110 and a second compressor 120 that are connected to discharge-side gas piping 13 in parallel.

In this embodiment, as the first compressor 110, a variable-speed compressor (inverter compressor) in which the rotational speed is variable due to inverter control is used, and as the second compressor 120, a constant-speed compressor in which the rotational speed is constant is used.

The first and second compressors 110 and 120 may be a rotary compressor or a scroll compressor. In this embodiment, however, the first compressor 110 is made a rotary compressor, and the second compressor 120 is made a scroll compressor.

A refrigerant discharge pipe 110a of the first compressor 110 is connected to the discharge-side gas piping 13 via an oil separator 111 and a check valve 112. A refrigerant discharge pipe 120a of the second compressor 120 is connected to the discharge-side gas piping 13 via an oil separator 121 and a check valve 122.

The oil separator 111, 121 separates a refrigerator oil contained in a high-pressure discharged gas refrigerant, and the check valve 112, 122 inhibits the high-pressure discharged gas refrigerant sent from the other compressor from entering the own compressor.

The accumulator 160 is provided on the refrigerant suction side of the compressors 110 and 120 to return the refrigerant that finished its work. From the accumulator 160, a main suction pipe 161 for a low-pressure refrigerant gas is led, and a branch pipe 162 is provided in the end part of the main suction pipe 161.

The branch pipe 162 is forked into two branches. One branch is connected with a suction pipe 163 for the first compressor 110, and the other branch is connected with a suction pipe 164 for the second compressor 120. In this embodiment, since the first compressor 110 is the rotary compressor requiring less liquid back amount, a sub accumulator 113 is provided on the suction side of the first compressor 110.

The oil separator 111 on the first compressor 110 side is connected to the suction pipe 164 for the second compressor 120 via oil return piping 114 having a capillary tube 115 serving as a pressure reducing means.

Similarly, the oil separator 121 on the second compressor 120 side is connected to the suction pipe 163 for the first compressor 110 via oil return piping 124 having a capillary tube 125 serving as a pressure reducing means.

The oil return piping 114 leading from the first compressor 110 side to the second compressor 120 side is provided with a solenoid valve 116 arranged in parallel with the capillary tube 115.

The solenoid valve 116 is controlled by a control section, not shown, of the outdoor unit 100. The solenoid valve 116 is turned off when the first compressor 110 is being operated, and is turned on when the first compressor 110 is not being operated. Thereby, a bypass circuit that bypasses the capillary tube 115 is formed.

The connecting position of the oil return piping 114 to the suction pipe 164 is a position at which the refrigerator oil supplied from the oil return piping 114 to the second compressor 120 side can drop on account of the gravity. For example, in the case where the suction pipe 164 has a tilting part sloping downward toward the branch pipe 162 side, the oil return piping 114 is connected to this tilting part.

According to this configuration, since the suction pipe 163 and the suction pipe 164 communicate with each other in the portion of the branch pipe 162, when the second compressor 120 is in a non-operating state, the refrigerator oil supplied from the oil return piping 114 to the second compressor 120 side is sucked into the first compressor 110, and when the second compressor 120 is in an operating state, the refrigerator oil supplied from the oil return piping 114 to the second compressor 120 side is sucked into the second compressor 120 directly.

Next, the operating action of this refrigeration apparatus is explained. When a capacity lower than a predetermined value is required, only the first compressor 110 is operated while the rotational speed thereof is controlled by an inverter with the second compressor 120 being in a non-operating state. In contrast, when a predetermined or higher capacity is required, the constant-speed second compressor 120 is operated together with the first compressor 110.

At the time of air cooling operation, the four-way valve 130 is switched over to a state indicated by solid lines in FIG. 1. Thereby, the gas refrigerant discharged from the compression mechanism section 101 is brought from the four-way valve 130 to the outdoor heat exchanger 140, being heat exchanged with the outside air, and is condensed (at the time of air cooling operation, the outdoor heat exchanger 140 acts as a condenser).

The liquid refrigerant condensed by the outdoor heat exchanger 140 passes through a check valve 151 connected in parallel to the outdoor expansion valve 150, and is supplied to the indoor unit 200.

On the indoor unit 200 side, the liquid refrigerant is decompressed to a predetermined pressure by the indoor expansion valve 211, and thereafter is heat exchanged with the indoor air by the indoor heat exchanger 210 to evaporate. Thereby, the indoor air is cooled (at the time of air cooling operation, the indoor heat exchanger 210 acts as an evaporator).

The gas refrigerant evaporated by the indoor heat exchanger 210 goes into the accumulator 160 via the four-way valve 130. After the liquid refrigerant has been separated, the gas refrigerant is returned to the compression mechanism section 101.

At the time of heating operation, the four-way valve 130 is switched over to a state indicated by chain lines in FIG. 1. Thereby, the gas refrigerant discharged from the compression mechanism section 101 is brought from the four-way valve 130 to the indoor heat exchanger 210, being heat exchanged with the indoor air, and is condensed. Thereby, the indoor air is warmed (at the time of air cooling operation, the indoor heat exchanger 210 acts as a condenser).

The liquid refrigerant condensed by the indoor heat exchanger 210 passes through the indoor expansion valve 211 the valve opening of which is controlled according to the heating capacity, and is supplied to the outdoor unit 100.

On the outdoor unit 100 side, the liquid refrigerant is decompressed to a predetermined pressure by the outdoor expansion valve 150, and thereafter is heat exchanged with the outside air by the outdoor heat exchanger 140 to evaporate (at the time of heating operation, the outdoor heat exchanger 140 acts as an evaporator).

The gas refrigerant evaporated by the outdoor heat exchanger 140 goes into the accumulator 160 via the four-way valve 130. After the liquid refrigerant has been separated, the gas refrigerant is returned to the compression mechanism section 101.

When both of the first and second compressors 110 and 120 are being operated (at this time, the solenoid valve 116 is off), the refrigerator oil separated by the oil separator 111 on the first compressor 110 side is supplied to the suction pipe 164 of the second compressor 120 via the oil return piping 114, and the refrigerator oil separated by the oil separator 121 on the second compressor 120 side is supplied to the suction pipe 163 of the first compressor 110 via the oil return piping 124. Thereby, the amounts of refrigerator oil in the compressors 110 and 120 are made approximately equal.

When only the first compressor 110 is being operated, and the second compressor is not being operated (in this case as well, the solenoid valve 116 is off), the refrigerator oil supplied from the oil return piping 114 to the second compressor 120 side is sucked into the first compressor 110.

When the operation of the compressors 110 and 120 is stopped and restarted, first, the first compressor (inverter compressor) 110 is restarted. In the present invention, before the restart of the first compressor 110, the solenoid valve 116 is turned on.

Thereby, the bypass circuit that bypasses the capillary tube 115 is formed, and the discharge pipe 110a side and the suction pipe 163 side of the first compressor 110 become in an approximately equalized state. Therefore, the first compressor (inverter compressor) can be started surely.

Figure 3:
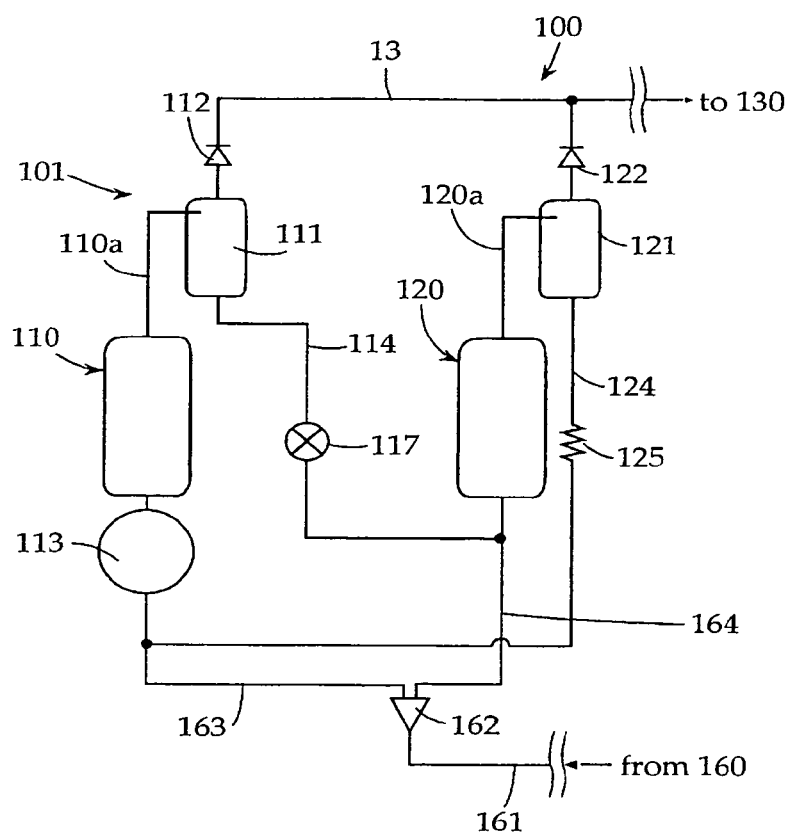
FIG. 3 is a compressor section of an outdoor unit similar to FIG. 2 showing another embodiment of the invention.

As another embodiment, in place of the parallel circuit of the capillary tube (pressure reducing means) 115 and the solenoid valve 116, an electronic expansion valve 117 (FIG. 3), the valve opening of which is controllable, may be used so that at the time of normal operation, the electronic expansion valve is throttled to a predetermined degree, and at the time of restarting, the electronic expansion valve is fully opened.

In the above-described embodiments, one first compressor (inverter compressor) and one second compressor (constant-speed compressor) are combined. However, even in the case where both of the first and second compressors are provided in plural numbers, the present invention can be applied.

What is claimed is:

1. A refrigeration apparatus, comprising:
   an outdoor unit including at least a first compressor and a second compressor, which are connected in parallel with each other, wherein the first compressor is a variable-speed compressor in which a rotational speed is variable due to inverter control, and the second compressor is a constant-speed compressor in which a rotational speed is constant,
   a first oil separator attached to the first compressor and connected to a suction pipe of the second compressor via a first oil return piping including a pressure reducing means,
   a second oil separator attached to the second compressor and connected to a suction pipe of the first compressor via a second oil return piping including a pressure reducing means, the suction pipes of the first and second compressors being connected together, and
   a solenoid valve that selectively forms a bypass circuit with respect to the pressure reducing means, connected in parallel with the pressure reducing means of the first oil return piping, said solenoid valve being opened when the first compressor is restarted.

2. The refrigeration apparatus according to claim 1, wherein an electronic expansion valve is used in place of a parallel circuit of the pressure reducing means and the solenoid valve in the first oil return piping.

3. A method for controlling a refrigeration apparatus, the refrigeration unit comprising an outdoor unit including at least a first compressor and a second compressor, which are connected in parallel with each other, wherein the first compressor is a variable-speed compressor in which a rotational speed is variable due to inverter control, and the second compressor is a constant-speed compressor in which a rotational speed is constant; a first oil separator attached to the first compressor and connected to a suction pipe of the second compressor via a first oil return piping including a pressure reducing means; and a second oil separator attached to the second compressor and connected to a suction pipe of the first compressor via a second oil return piping including a pressure reducing means, the suction pipes of the first and second compressors being connected together; and a solenoid valve that selectively forms a bypass circuit with respect to the pressure reducing means, connected in parallel with the pressure reducing means of the first oil return piping, said method comprising:

turning on the solenoid valve in restarting the first compressor after operation of the first and second compressors has been stopped, to form a bypass circuit and to cause a discharge side and a suction side of the first compressor to be in an approximately equalized state; and thereafter restarting the first compressor.

4. The method for controlling a refrigeration apparatus according to claim 3, wherein an electronic expansion valve is used in place of a parallel circuit of the pressure reducing means and the solenoid valve in the first oil return piping; in restarting the first compressor after the operation of the first and second compressors has been stopped, the solenoid valve is fully opened to cause the discharge side and the suction side of the first compressor to be in an approximately equalized state; and thereafter the first compressor is restarted.

5. A refrigeration apparatus, comprising:

an outdoor unit including at least a first compressor and a second compressor, which are connected in parallel with each other, wherein the first compressor is a variable-speed compressor in which a rotational speed is variable due to inverter control, and the second compressor is a constant-speed compressor in which a rotational speed is constant, a first oil separator attached to the first compressor and connected to a suction pipe of the second compressor via a first oil return piping, a second oil separator attached to the second compressor and connected to a suction pipe of the first compressor via a second oil return piping including a pressure reducing device, the suction pipes of the first and second compressors being connected together, and an electric expansion valve, or a combination of another pressure reducing device and a solenoid valve arranged parallel to each other, disposed in the first oil return piping, the solenoid valve selectively forming a bypass circuit with respect to the another pressure reducing device, said electric expansion valve or the solenoid valve being opened when the first compressor is restarted to cause a discharge side and a suction side of the first compressor approximately equal to each other.

* * * * *